United States Patent

[11] 3,582,849

[72] Inventors Richard F. Post
Walnut Creek;
Ralph W. Moir, Livermore, both of, Calif.
[21] Appl. No. 881,787
[22] Filed Dec. 3, 1969
[45] Patented June 1, 1971
[73] Assignee The United States of America as represented by the United States Atomic Energy Commission

[54] ELECTROMAGNETIC APPARATUS FOR PRODUCING AND CONTAINING HIGH TEMPERATURE PLASMAS
8 Claims, 13 Drawing Figs.
[52] U.S. Cl. .................................................. 335/213,
176/5, 335/299, 335/216
[51] Int. Cl. .................................................. H01f 5/00
[50] Field of Search .......................................... 335/210,
213, 216, 299; 176/5; 310/11

[56] References Cited
UNITED STATES PATENTS
3,356,976 12/1967 Sampson et al. ............... 335/216
3,431,523 3/1969 Donadieu ....................... 335/216X Primary Examiner—G. Harris
Attorney—Roland A. Anderson ABSTRACT: Electromagnetic apparatus including a pair of C-shaped field coil segments which produce a magnetic field defining a quadrupole-type magnetic potential well suitable for containing a high temperature plasma. The segments are adapted to be separately or concurrently energized with equivalent or relatively variable electrical currents so as to produce deeper potential wells for more effective containment and to permit a wide variety of manipulations, not possible with previous designs, to facilitate trapping and heating of the plasma. Other operations involved in the production and utilization of high temperature plasmas may also be effected.

INVENTORS.
Richard M. Post
Ralph W. Moir

INVENTORS.
Richard M. Post
Ralph W. Moir

INVENTORS.
Richard M. Post
Ralph W. Moir
BY
ATTORNEY.

INVENTORS.
Richard M. Post
Ralph W. Moir

FILAMENTARY CONDUCTOR ELEMENTS USED IN
ANALYTIC APPROXIMATION

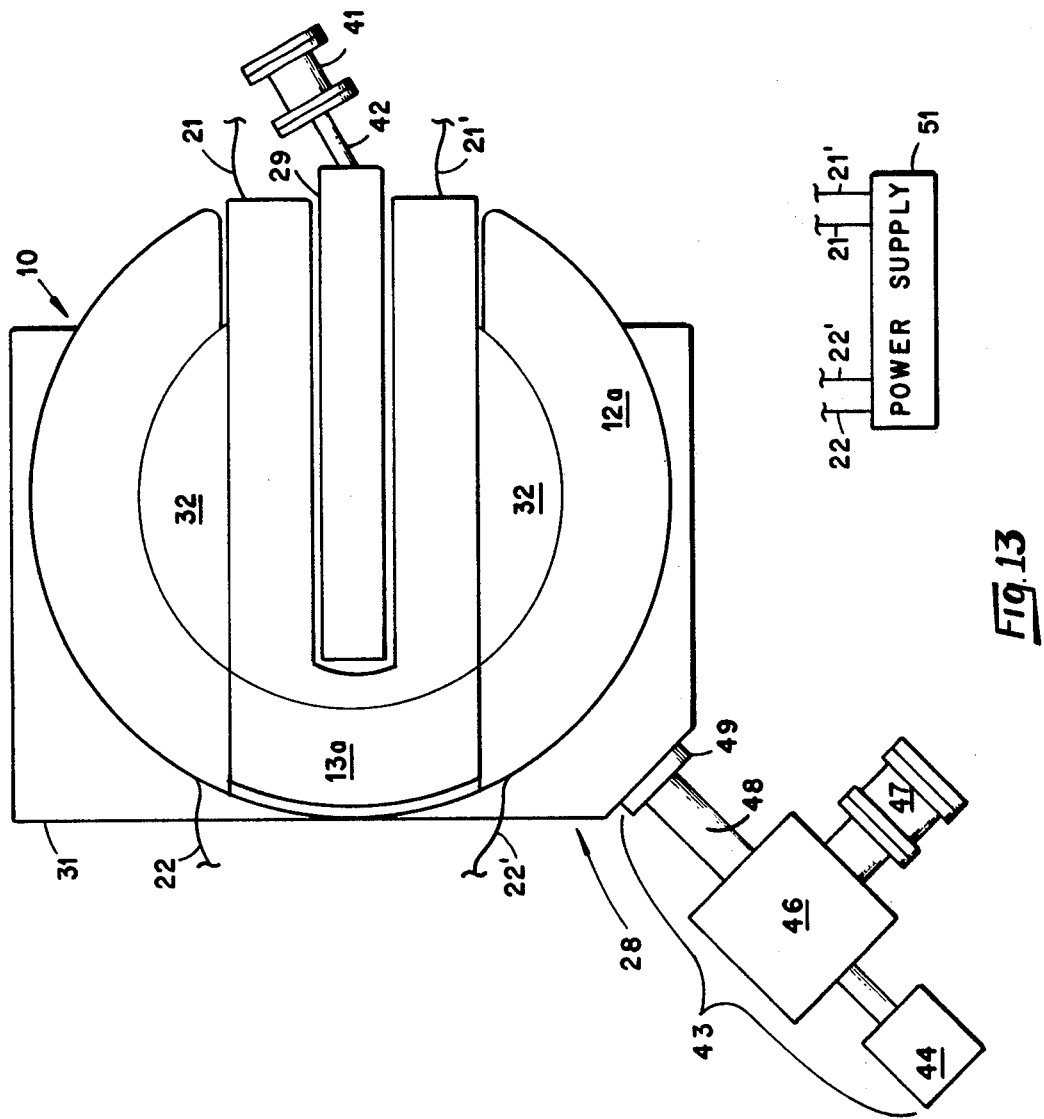

3,582,849

ELECTROMAGNETIC APPARATUS FOR PRODUCING AND CONTAINING HIGH TEMPERATURE PLASMAS

BACKGROUND OF THE INVENTION

The invention described herein was conceived, or made, under Contract No. W-7405-ENG-48 with the United States Atomic Energy Commission.

Electromagnetic field coil structures of the so called tennis ball or baseball seam configuration are among those considered to be of considerable promise for use in producing magnetic fields for stably containing high temperature plasmas. Such plasmas may be produced for a wide variety of utilitarian purposes such as in conducting fusion or thermonuclear reactions, for propulsion, as intense light sources, in spectroscopy and the like. An electromagnet structure of the baseball seam variety is disclosed in an article entitled "A Tennis Ball Seam Coil for Plasma Physics Research," published in the Proceedings of the Second International Conference Magnet Technology, Oxford, England, July 10—13, 1967. This type coil, albeit of simpler construction than those proposed previously, may be considered to produce a minimum B magnetic field similar to a four-bar Ioffe field or the field of a magnetic mirror pair with a superimposed cusped quadrupole field. Such a field has superior plasma containment characteristics. The geometrically fixed configuration of such a coil structure, however, restricts flexibility of operation since the magnetic field distribution is fixed and adjustment of the potential well depth and other properties of the magnetic field is difficult without reconstructing the coil or using cumbersome accessory devices.

Another baseball seam electromagnetic coil is disclosed in copending application Ser. No. 753,189, filed on Aug. 16, 1968 by Carl D. Henning and Anthony K. Chargin now U.S. Pat. No. 3,491,318 in which multiple layers may be separately energized to modify the magnetic field configuration, e.g., to regulate the potential well depth, modify the mirror ratio, regulate other characteristics of the field in a particular manner and the like. Some of the problems associated with a fixed coil geometry are overcome with this design. With all of the various baseball seam-type coils proposed heretofore, provision of the plasma is generally accomplished by injection of energetic neutral gas particles into the field to be ionized by a Lorentz mechanism or by collision processes so as to be trapped in the containment zone defined by the potential well.

There exists a need for a baseball seam electromagnetic coil which would permit the use of other plasma injection procedures such as the injection of a high temperature ionized gas or ion beam and to provide even greater latitude in varying mirror ratios, magnetic potential well depth, asymmetry of the fields, etc. With such an electromagnet greater flexibility in the choice of injection method and a much greater variety of plasma manipulations could then be accomplished.

SUMMARY OF THE INVENTION

The present invention relates generally, to methods and apparatus for producing high temperature gases or plasmas in a containment zone defined by a magnetic field and, more particularly, to a novel intermeshed bipartite magnet coil structure for producing magnetic containment zones for use in such methods and apparatus.

The so called "baseball " or "tennis ball" seam magnet coil structure of conventional practice comprises a single, plural turn, continuous winding having a configuration generally corresponding to that of a baseball or tennis ball seam for which it is named. Such configuration therefore may be seen to comprise a pair of matching generally circular C-shaped lobes arranged in spaced parallel relationship across a transverse plane of symmetry and with the open ends of the lobes joined by two dimensionally curved coil portions extending coextensively across a vertical plane of symmetry. The magnetic field produced thereby is characterized as a quadrupole magnetic field.

The magnet coil structure of the present invention, on the other hand, is constructed of a pair of generally C-shaped magnet coil segments arranged in an intermeshing relationship. Each of such coil segments comprises a pair of generally C-shaped lobes disposed coextensively in spaced parallel relationship across a vertical plane of symmetry. The C-shaped lobes may be relatively less curved than in the case of the baseball seam magnetic, i.e., portions may lie substantially in a plane rather than being curved as in the baseball seam magnet and the open ends of the C-shaped lobes may be joined by relatively sharply curved, i.e., U-coil portions disposed oppositely across a transverse plane of symmetry. Two such coil segments are arranged in a mirror image relationship, rotated substantially 90° with respect to each other and intermeshed so that the open end of each is disposed oppositely across the closed spaced parallel closed portions of the C-configuration of the other. This configuration also defines a substantially spherical central volume in which a magnetic containment field is generated by means of eight-quadrantially paired coil segments rather than by four-quadrantially spaced coil segments as in the baseball seam magnet but still producing a quadrupole magnetic containment field.

The two coil segments can be energized as a unit and the magnet coil structure employed in somewhat the same manner as in the case of the "baseball seam" magnet of prior practice. However, such coil segments may also be energized individually so that a modified magnetic field configuration can be conveniently produced. Moreover, the mirror ratio of the system can be varied by varying the distance, i.e., the degree of intermeshing of the two segments. Also, the intensity, for example, of the magnetic field of one of the solenoid segments can be varied, in such a manner, as to permit the injection and trapping of energetic charged particles by means which cannot be used with the usual "baseball seam" magnets, as described more fully hereinafter.

In any event it is found that minimum B magnetic potential well plasma containment fields, having deeper potential wells, and larger effective containment zones, providing for more effective plasma containment are provided as compared with the previous magnet coil structures. Moreover, it is found that the improved containment characteristic may be achieved despite a significant decrease in the electrical energy required to provide equivalent magnetic field strengths.

Accordingly, it is an object of the invention to provide a magnet coil structure for generating magnetic fields defining a zone for the confinement of a high temperature plasma.

Another object of the invention is to provide a novel magnet coil structure for generating quadrupole magnetic potential well containment zones for containing high temperature plasmas.

Still another object of the invention is to provide a magnet coil structure employing a pair of intermeshing magnet coils with which quadrupole magnetic potential well zones for containment high temperature plasmas may be economically and effectively produced.

A further object of the invention is to provide a magnet coil structure employing a pair of generally C-shaped magnet coil segments arranged in mirror image intermeshed relationship to generate quadrupole magnetic potential well containment zone in which the magnet coil segments can be concurrently separately, and/or differentially energized to produce varied magnetic field configurations and to perform operations not possible with a "baseball seam" type magnet coil structure.

Other objects and advantageous features of the invention will be apparent in the following description taken in conjunction with the accompanying drawing of which:

BRIEF DESCRIPTION OF THE DRAWING

FIG. 13 is an illustration of the device incorporated with other elements to provide a continuous operating controlled fusion reactor.

BRIEF DESCRIPTION OF AN EMBODIMENT

Figure 1:
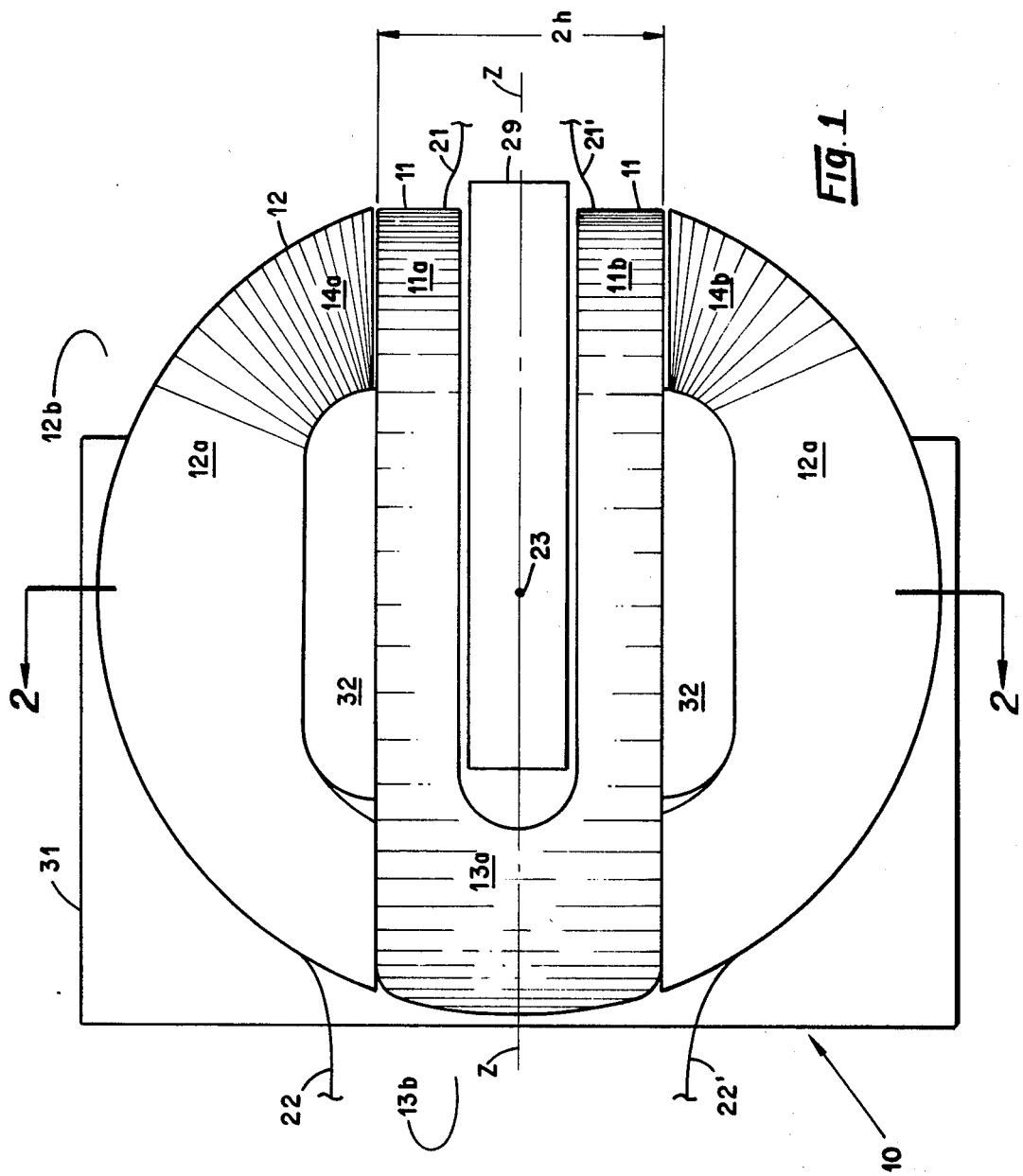
FIG. 1 is an elevational view of the electromagnet coil structure of the invention.
Figure 2:
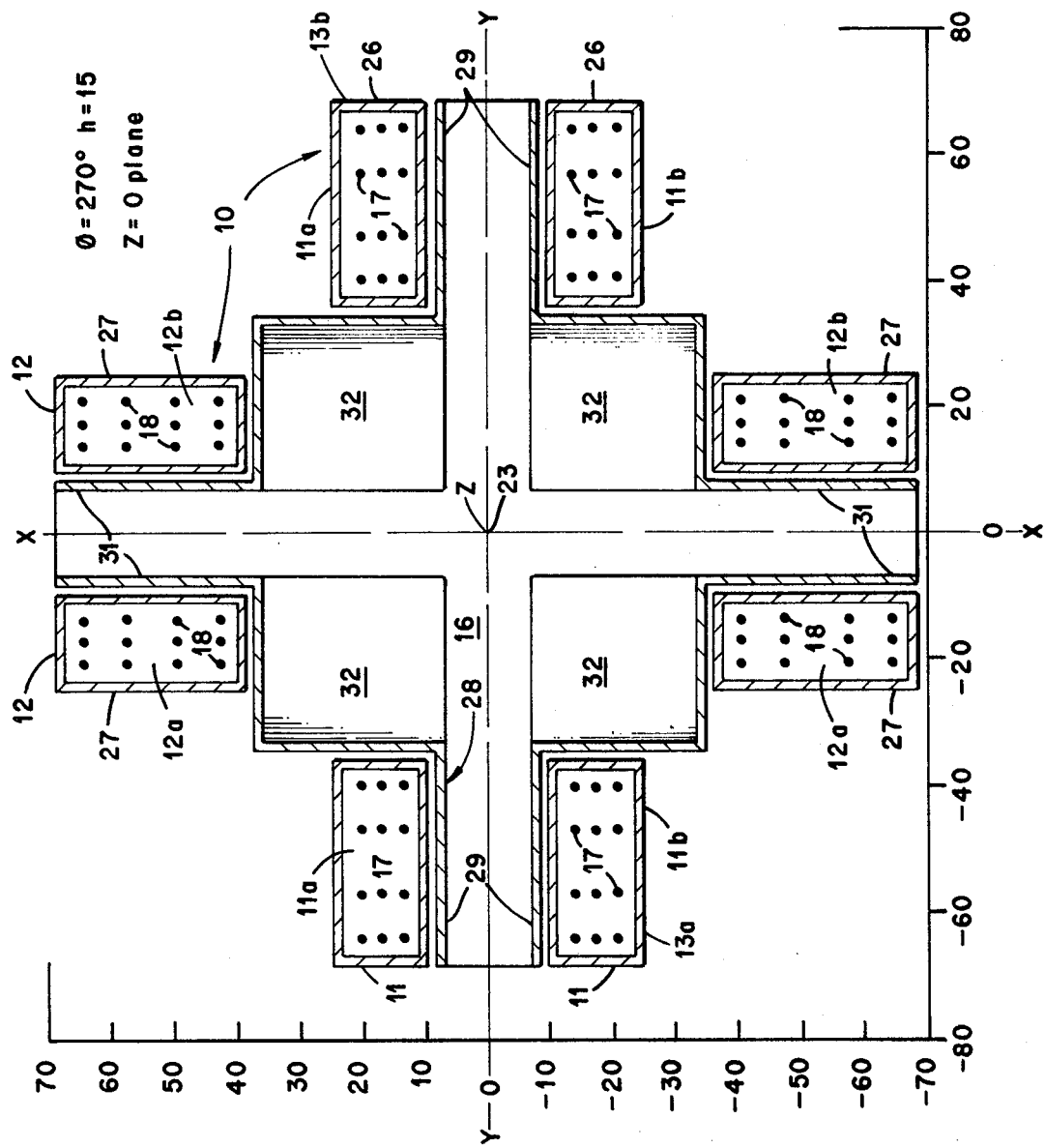
FIG. 2 is a view along plane 2—2 as shown on FIG. 1.

An electromagnetic coil structure 10 accordance with the invention is constructed of two electromagnet segments 11 and 12 having the configuration shown in FIGS. 1 and 2 of the drawing. Each of said segments, 11 and 12, are of generally similar configuration which, in a side view, is of general C-shaped defined by a pair of spaced parallel generally annular arcuate sector, i.e., C-shaped lobe members 11a, 11b, and 12a, 12b, respectively. The corresponding open ends of said generally annular arcuate sector C-shaped members 11a, 11b, and 12a, 12b, are joined by coil portions, 13a, 13b, and 14a, 14b, respectively, to complete said segments. Accordingly, in an edge view, i.e., at right angles to the side view, the segments may be seen to present a general U-shaped configuration.

As indicated above, the two segments are arranged in a mirror image configuration rotated essentially 90° and intermeshed with the portions 13a, 13b, and 14a, 14b being positioned oppositely by and centered across the median dividing plane of the paired parallel C-shaped portions 11a, 11b, and 12a, 12b, respectively. The degree of intermeshing can be varied as described hereinafter so that the central space or chamber 16 enclosed by said segments ranges in shape from a slightly flattened spherical through a generally spherical to an elongated generally oblate spheroidal configuration, all of which are herein referred to as generally spheroidal, for simplicity.

The electromagnetic coil segments are generally constructed with a plurality of turns of a conductor wound continuously and unidirectionally in insulated layers disposed along the perimeter, i.e., about the circumference of a particular segment. In FIG. 2, the conductors 17 and 18, of coil segments 11 and 12, respectively, are shown as being wound of one continuous conductor. However, it would, of course, be possible to construct said segments of separate superimposed paced layered conductor segments (not shown) or the equivalent.

The conductors 17 and 18 are provided with terminals 21, 21' and 22, 22' for connection to a power supply as described more fully hereinafter. In usual practice the conductor layers are wound to provide a rectangular cross section; however, the cross section can have other geometric cross sections, particularly, those which lend themselves to convenient mathematical analysis and approximation.

The magnetic field produced by the foregoing structure has its minimum value effectively at the center 23 of the generally spheroidal chamber volume 16 and is in the form of a somewhat spindle-shaped centroid. In the region within chamber 16 surrounding the center 23, the magnetic field intensity increases in every direction with increasing distance from the center. Moreover, the magnetic field intensity $|B|$ along a set of nested ellipsoidal surfaces is a constant. Since $|B|$ increases in every direction as the distance from the center increases, there is provided a magnetic field containment zone which is highly stabilized against loss of the plasma. Local penetrations of the plasma of the magnetic field tend to increase the local magnetic field intensity so as to inherently counteract such penetration. This behavior is contrasted, for example, with a simple axial field in which local penetrations weaken the local magnetic field intensity to allow easy escape of the plasma. Moreover, all of the magnetic field lines which pass through the last closed contour of $|B|$ are curved away from the center providing a good curvature, i.e., a magnetic field line curvature which is highly resistant to localized plasma penetration. Also these field lines leave the containment field configuration by passing near a conductor thus providing a high longitudinal mirror ratio, i.e., the magnetic gradient increases at a rapid rate providing for enhanced reflection of escaping charged particles back into the containment zone. The magnetic field thereby defines a charged particle containment zone with its center at the center of the spheroidal chamber volume 16 but in which the effective containment volume is only a little less than that of volume 16, i.e., which is effectively included within the last contour of constant B in which good curvature of the field lines occur. High volumetric efficiency is thereby achieved since the plasma may occupy a large proportion of the volume 16. Since there are two conductor sets they can be separately energized and varied thus making possible pulsed plasma trapping as well as permitting independent variation of the mirror ratio at either end of the confinement zone as discussed elsewhere herein. By changing the separation between the two sets of coils the well depth and mirror ratio can be changed. This configuration has been termed a Yin-Yang coil because of resemblance of schematic representations to the Yin-Yang symbol of ancient Chinese philosophy which terminology can conveniently serve to distinguish from the baseball seam coil structure of prior existence.

The magnetic field strengths produced by the coil structure may range from below about 1 kilogauss in laboratory devices to as high as can be attained with power producing reactors. With such reactors, maximum magnetic field strengths approaching or exceeding 200 kilogauss are regarded as desirable. Generally the maximum field strength will occur at the peak of a mirror region. Mirror ratios, i.e., $R_{||}=B_{max}/B_{min}$ in the range of about 1.5 to about 7.0 may generally be employed as a usual practice. A characteristic ampere turn may produce a magnetic field intensity of about 0.003 to 0.006 gauss for the minimum field and 1.5 to 7.0 times such values for the field at the mirrors with correlative scaling increases for increased ampere turns.

The electromagnet segments 11 and 12 are generally constructed upon or encased in a coil form or rigid housing 26, 27, respectively, constructed of a magnetically permeable material, e.g., aluminum, aluminum alloy, nonmagnetic steel, etc., to provide rigid mechanical support. In some instances a rigid laminated resin-fiberglass encasement or the like (not shown) may suffice. The conductors 17, 18, of segments 11 and 12 may be made hollow for circulation of a coolant therethrough by means (not shown) or other means may be employed for cooling such segments. Conventional conductor materials may be employed or cryogenic or superconductive conductor arrangements can also be used employing construction methods known in the art. With cryogenic and superconductor coils it will be appreciated that thermal insulation and cryogenic cooling means (not shown) will be disposed appropriately to prevent heating loss. For example, for construction of cryogenic or superconductor coil segments, one may follow the practice disclosed in the article entitled "Superconducting Baseball Coil for Plasma Confinement," C. D. Henning and C. E. Taylor, Proceedings of the First International Cryogenic Engineering Conference, Kyoto, Japan, Apr. 9—13, 1967, pp. 130—132.

Moreover, the open ends of the C-shaped coil segments may be provided with clamping bolts and supporting members or mounting arrangement (not shown) for offsetting the large mechanical expansive force produced by the magnetic fields as in usual Baseball coil magnet practice and to position the coil segments. Moreover, the C-shaped segments could be mounted on rigidly supported sliding mounts which could provide for relative movement of the segments to vary the degree of intermeshing to utilize certain effects which will be made apparent hereinafter.

Also, when utilized for producing plasma containment fields, an evacuable vessel is usually associated with the magnet coil structure for creating a region of high vacuum, i.e., below about $10^{16}$ mm. hg., or, preferably, below $10^{18}$ mm. hg., in chamber 16. More particularly, such a vessel 28, may comprise first and second boxlike shell portions 29, 31 arranged in 90° rotated intersecting relationship, and inserted through the mouth portions of coil segments 11 and 12, respectively. Although the boxlike members are shown as rectangular, a generally circular configuration could also be used. In the event that the volume enclosed in the intersecting region approximates the portion of chamber 16, desired to be used, the planar side shell portions 29, 31, may be welded along the lines of intersection to provide said vessel. However, substantially all of volume 16 may be employed by providing generally spherical or cylindrical curved shell portions 32 joined as by welding to shell portions 29, 31 to provide a generally enlarged cylindrical or generally spheroidal vessel shell portion defining volume 16. The vessel 16, constructed with said cylindrical sections may be used as the coil form on which said coil segments are wound. Vacuum pumps (not shown) may be connected to said vessel to provide the desired level of evacuation.

Magnetic field patterns including those of the Yin-Yang coil can be computed by well-known procedures. One such procedure for calculating the characteristics of a magnetic field produced by electrically energized conductors is the "MAFCO" code which is disclosed in Report No. UCRL-7744 at The University of California Radiation Laboratory, Rev. II, 1966, by W. A. Perkins and J. C. Brown. In brief, the code "MAFCO" is written in FORTRAN language suitable for calculation utilizing a wide variety of computers. Computations may be derived using a schematicized simplified representation of the coil such as that illustrated in FIG. 3 of the drawing. As illustrated therein, a coordinate system includes a Z-axis extending substantially along the axis about which the intersecting segments are rotated, i.e., passing centrally and medially between the parallel C-shaped magnet lobes of each segment. The Z-X plane then lies centrally between the lobes of segment 12 and transversely bisects the closed C-lobe portions of segment 13.

Figure 3:
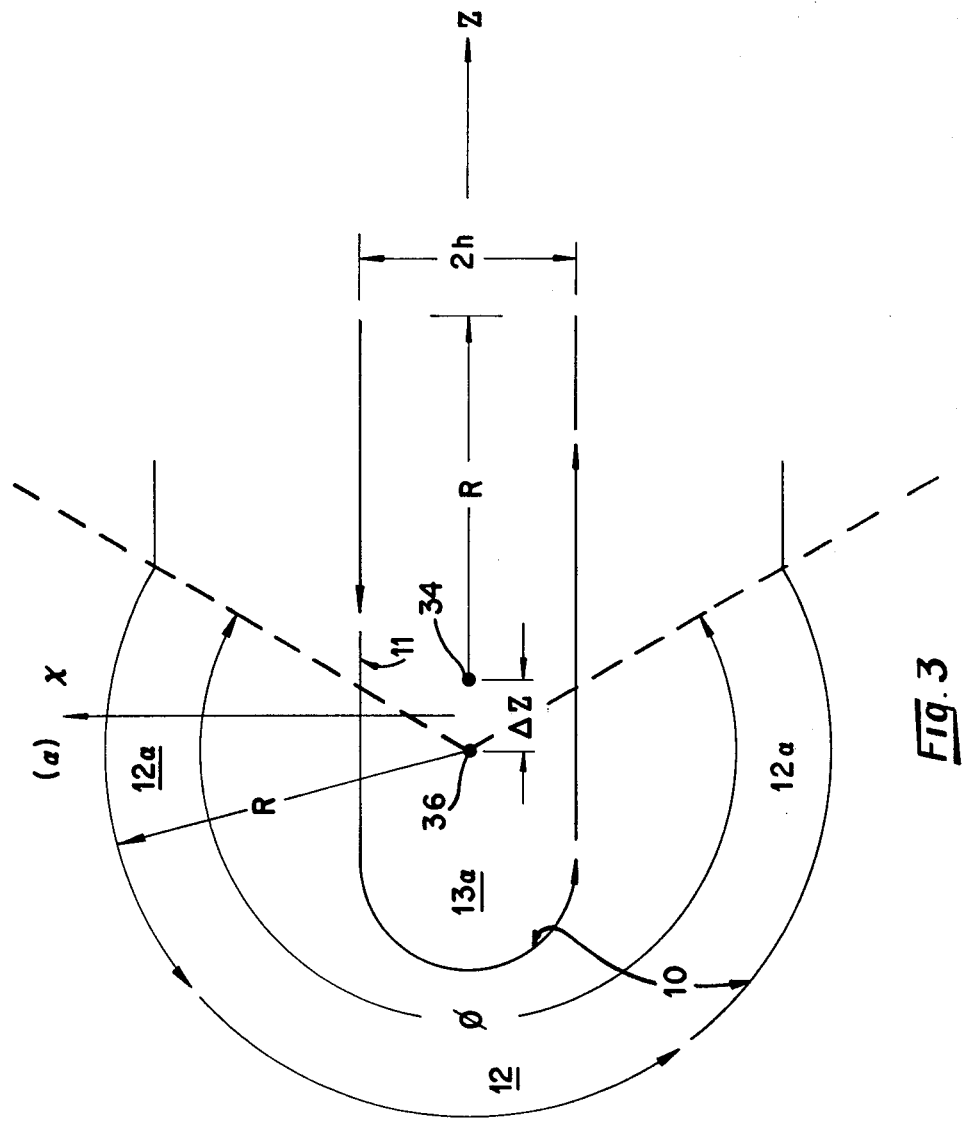
FIG. 3 is a simplified schematicized representation of the magnet structure of FIGS. 1 and 2 which is used for a mathematical characterization of the magnetic fields produced by the magnet coil structure as related to certain factors portrayed therein and for which graphically illustrated results appear in the following figures.

Moreover, in the simplified schematicized representation shown in FIG. 3, of the device of FIGS. 1 and 2, it is to be seen that the filamentary approximation of the coil 10 may be fully specified by the terms R, the outer radius of the conductor segments 11 and 12; $\Phi$, the angle that the arcuate portions of conductors 11 and 12 occupy; $h_n$ the height between a median plane and a side of conductors 11 and 12; and, $\Delta Z$, which is the displacement along the Z axis of the effective center 34, of the conductor 11 with respect to the center 36 of the conductor 12. When the centers 34 and 36 coincide, i.e., $\Delta Z=0$, such centers 34 and 36 also coincide with the point center 23 of chamber volume 16 as in the configuration of FIGS. 1 and 2. However, when $\Delta Z$ is not zero, i.e., $\Delta Z$ is a finite distance, the effective center of chamber volume 16 is a line equivalent in length and in the position of $\Delta Z$.

COMPUTATION OF THE MAGNETIC FIELD PATTERN

Figure 5:
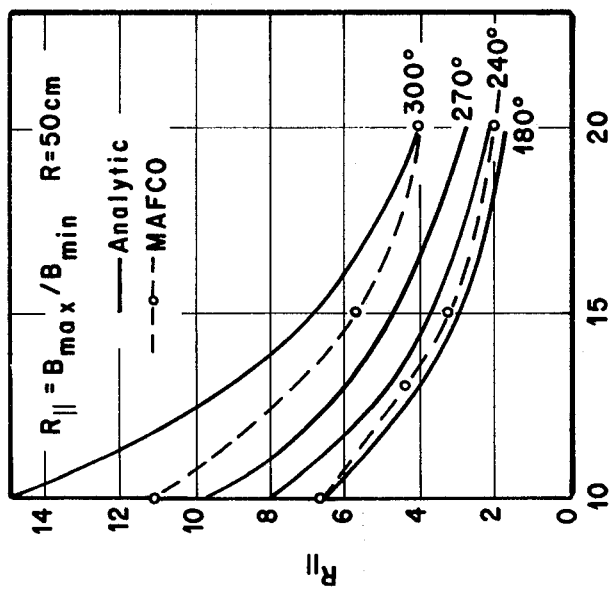
FIG. 5 is a graphical representation of variations in the value of the magnetic mirror ratio, i.e., $R_{||}=B_{max}/B_{min}$, as evaluated by MAFCO and analytic solutions, at various angular positions and with a variable spacing of the parallel lobes as in FIG. 4.

Using the MAFCO magnetic field calculating code, $B_{max}$ and $B_{min}$ were evaluated for several values of the other parameters with R held to a constant of 50 cm. The results together with results obtained with analytic approximations, discussed more fully hereinafter, for $B_{max}$ and $B_{min}$ and for the desired values of magnetic mirror ratio, $R_{11}=B_{max}/B_{min}$, are presented graphically in FIGS. 4 and 5 of the drawing, respectively. $B_{max}$ is the maximum value of the magnetic field intensity, B, which is produced along a field line and occurs as the field line passes into the area defined in the region of closest spacing between any two conductors of coil 10. Since the value of $B_{max}$ is relatively insensitive to which particular field line is chosen, for simplicity, that field line passing through the origin where the field intensity is at a minimum, i.e., $B_{min}$, is used herein. In FIG. 5, the effect of varying the spacing, i.e., the distance $h$, between the parallel C-shaped lobe members 11a, 11b and 12a, 12b, respectively, is shown.

Figure 7:
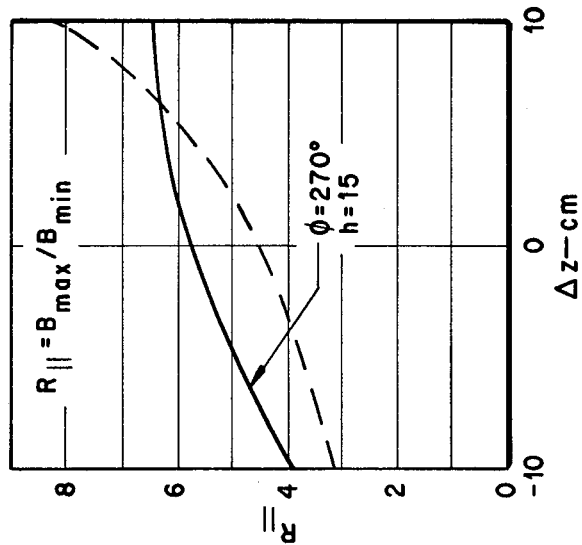
FIG. 7 is a graphical illustration of the variation in magnetic mirror ratio $R_{||}=B_{max}/B_{min}$ at $\Phi$ 270° and 15 cm. C-lobe spacing produced by a variation in $\Delta Z$ as in FIG. 6.
Figure 6:
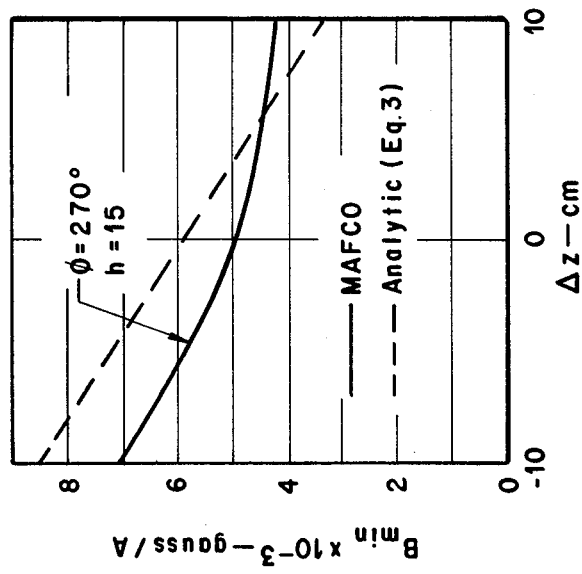
FIG. 6 is a graphical illustration of the variation in values for $B_{min}$ obtained by MAFCO and analytic solutions at a constant angle of 270° encompassed by a C-lobe and fixed spacing of parallel C-lobes of 15 cm, produced by a variation in $\Delta Z$, i.e., the axial spacing between the intermeshed C-shaped magnet coil segments.
Figure 8:
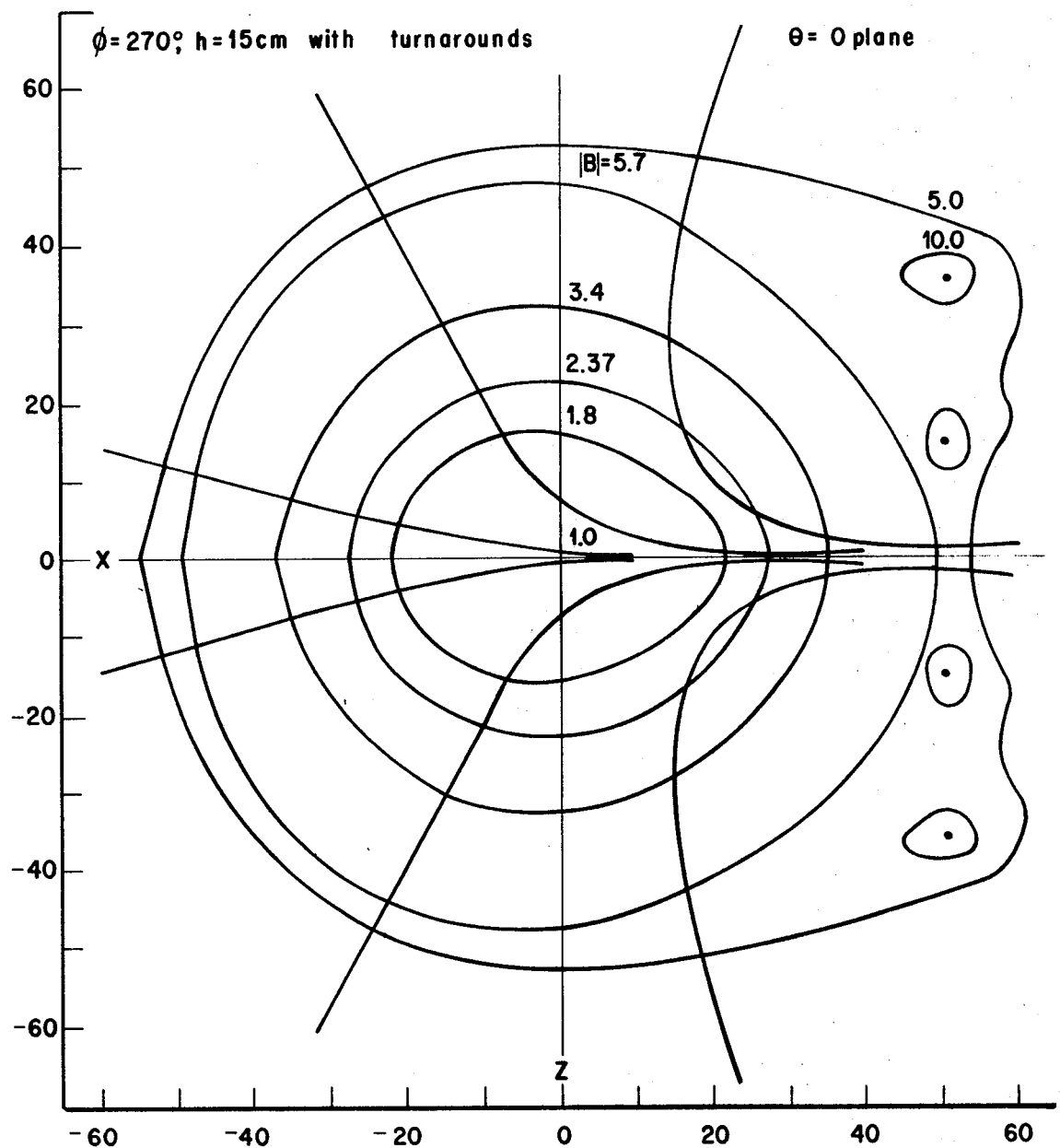
FIG. 8 is a graphical illustration of the contours of constant, i.e., uniform magnetic field intensity, B, in the $\theta=0$ plane with $\Phi$ of 270° and $h$ of 15 cm.
Figure 9:
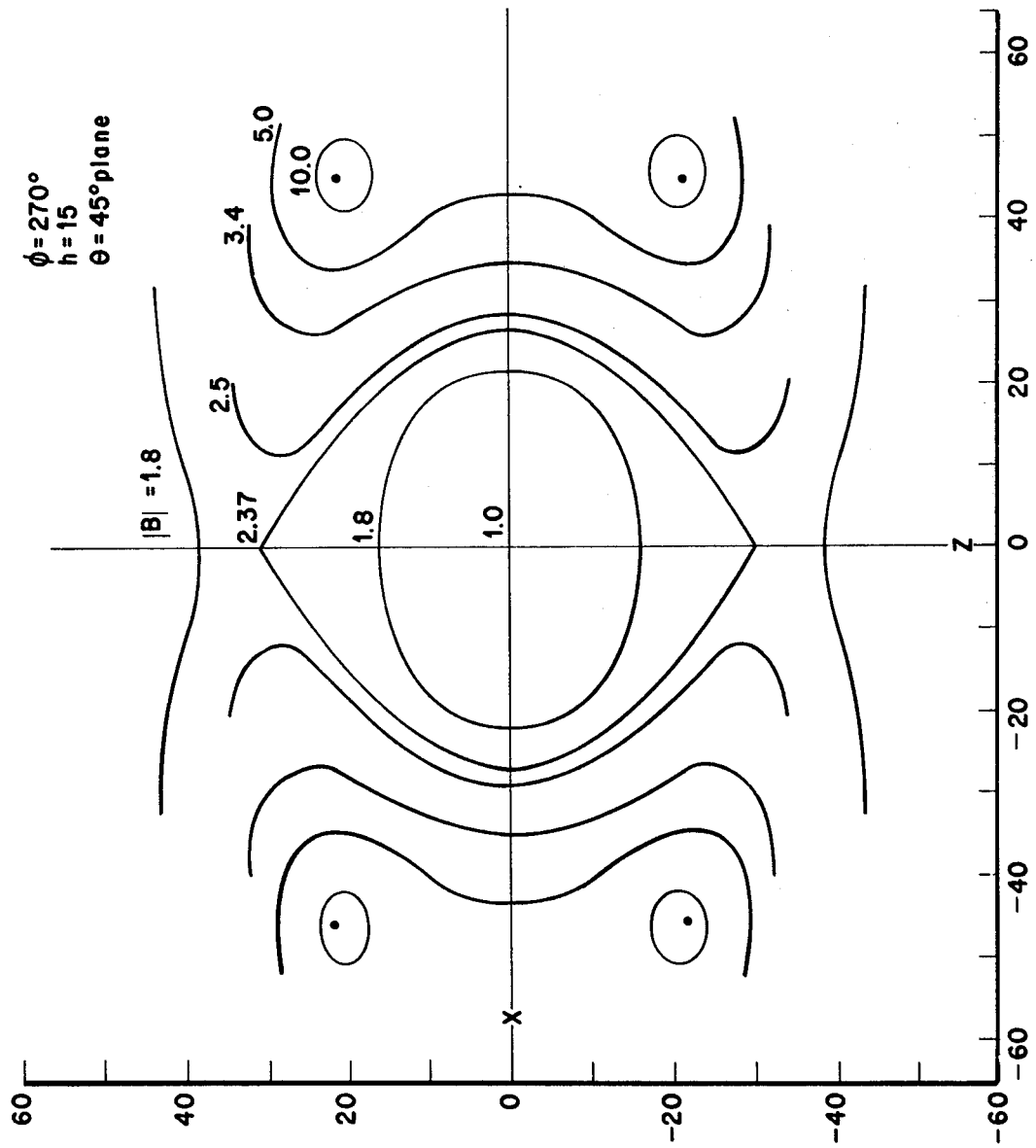
FIG. 9 is a plot similar to that of FIG. 8 but taken in the $\theta=45\alpha\frac{1}{4}$ plane.

The effect on $B_{min}$ of varying the coil separation, i.e., the displacement $\Delta Z$, of coil segment 11 along the Z axis away from coil segment 12 is illustrated in FIG. 6. Therein the factor $h$ is chosen to have a value of 15 cm. and, $\Phi$, a value of 270°. However, $\Phi$ may have a value in the range of about 180° to about 270° in practical systems. Varying the coil separation distance, $\Delta Z$, under similar condition, affects the mirror ratio, $R_{11}$, as shown graphically in FIG. 7 of the drawing. The mirror ratio employed in practice may range from about 1.5 to as high as can be attained, i.e., 7.0 and above. For most effective confinement mirror ratios of above about 5 are employed. With such a high mirror ratio particles of a wide energy range, approaching a Maxwellian distribution, may be confined. This characteristic contributes high stability to confinement against certain classes of instabilities which are deleterious to plasma containment. FIG. 8 graphically illustrates the contours of $|B|$=constant in the $\theta=0°$ plane under comparable conditions, i.e., where $\Phi=270°$ and $h=15$ cm., with turnarounds. FIG. 9 is a similar plot now, however, taken in the plane $\theta=45°$. Note that the contours open up, i.e., expand at somewhat lower values in the 45° plane than the 0° plane. While an angle of $\Phi=270°$ was chosen herein for purposes of illustration it may be noted that the C-shaped members may occupy an angle $\Phi$ in the range of about 180° to 270° provided that the distance $h$, finite conductor size, etc., are adjusted to provide a symmetrical or balanced distribution of the magnetic field intensities and the like.

Figure 10:
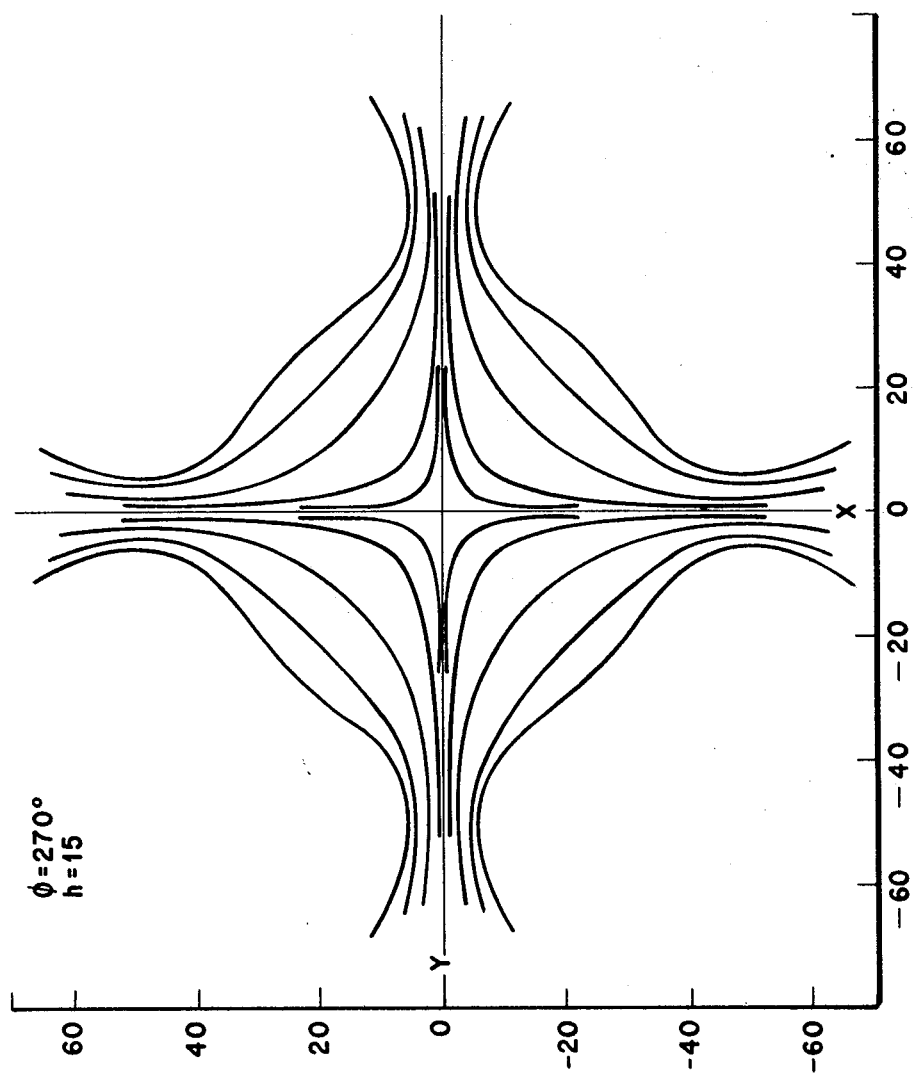
FIG. 10 is a graphical projection of magnetic field lines onto the Z=0 plane, i.e., the X—Y plane.
Figure 11:
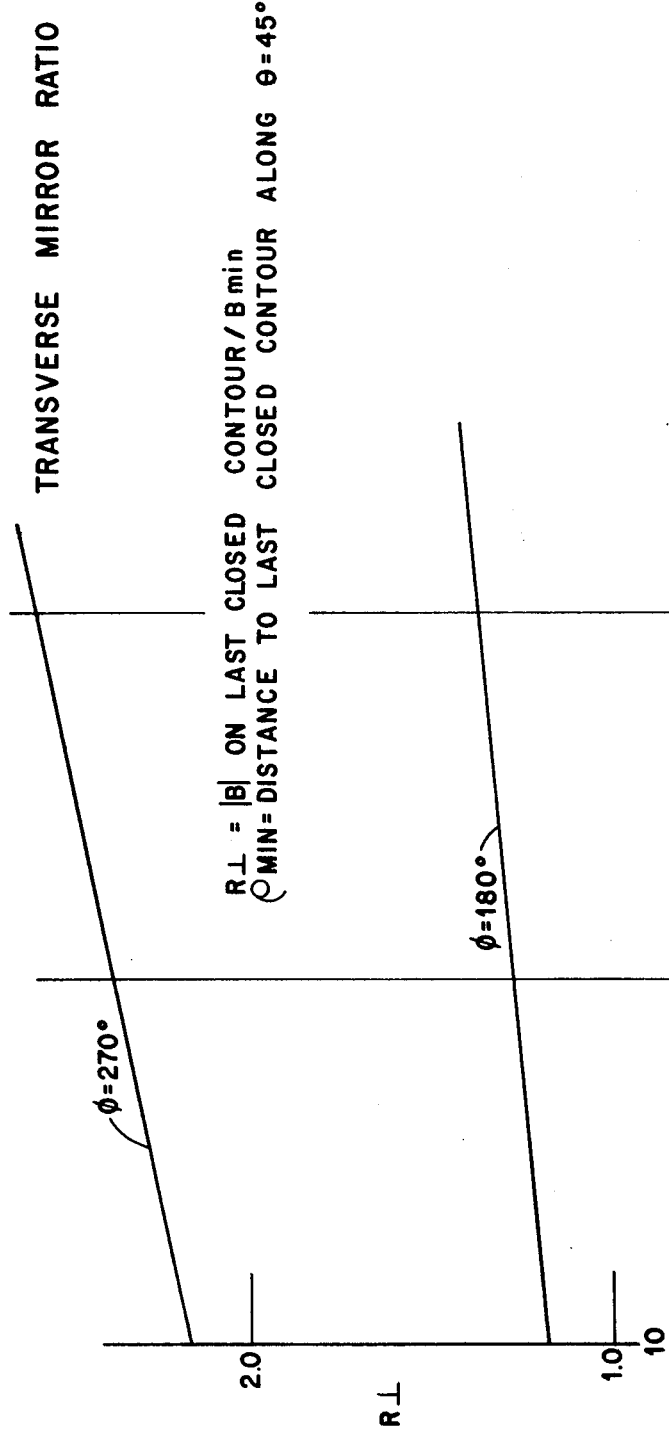
FIG. 11 is a graphical illustration of the transverse magnetic mirror ratio, $R\perp=|B|$ on the last closed contour of FIG. 10/$B_{min}$ at $\Phi=180°$ and at $\Phi=270°$. A plot of $\rho$ min = distance to last closed contour along $\theta=45°A$w plane is also shown therein.
Figure 11:
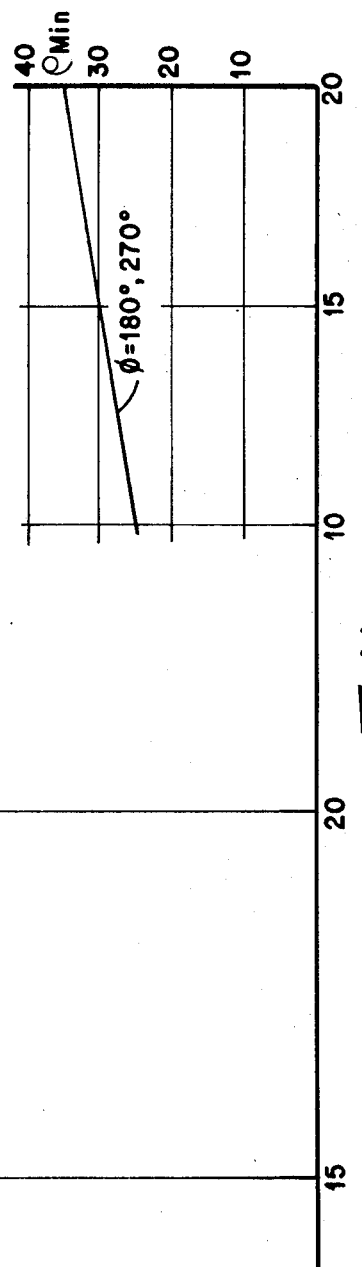

In FIG. 10 there is illustrated a projection of the field lines onto the Z=0 plane, i.e., into the X–Y plane. The field lines lie very near the Z=0 plane except for those near the origin. It will be noted that those field lines which pass through the closed $|B|$ contours are everywhere favorably curved whereas those field lines not passing through closed contours are unfavorably curved with respect to plasma containment characteristics. In FIG. 11 there is presented a plot of the parameters of the last closed contour of $|B|$ wherein the last closed contour $R\perp$ is defined as the maximum radius sphere which could lie entirely within the last closed surface of $|B|$ = constant.

The effect of utilizing a finite coil size rather than a mathematical approximation thereof was determined using a finite, i.e., practical coil, approximated by twelve filamentary conductors 17 as shown in FIG. 2. The minimum field intensity was changed only 0.2 percent indicating good agreement. However, $B_{max}$ was decreased by 16 percent thereby reducing the effective mirror ratio from 5.8 to 4.9. The perpendicular magnetic potential well depth (R⊥) was increased by 2 percent.

ANALYTIC APPROXIMATIONS OF THE FIELDS

The maximum field occurs as a field line passes between two conductors, which locally look nearly like two parallel infinite conductors. Hence:

$$B_{max} \chi \frac{\mu_0 I}{\pi h} = 0.04 \left(\frac{10 \text{ cm}}{h}\right) \frac{\text{gauss}}{\text{amp}}$$

Figure 12:
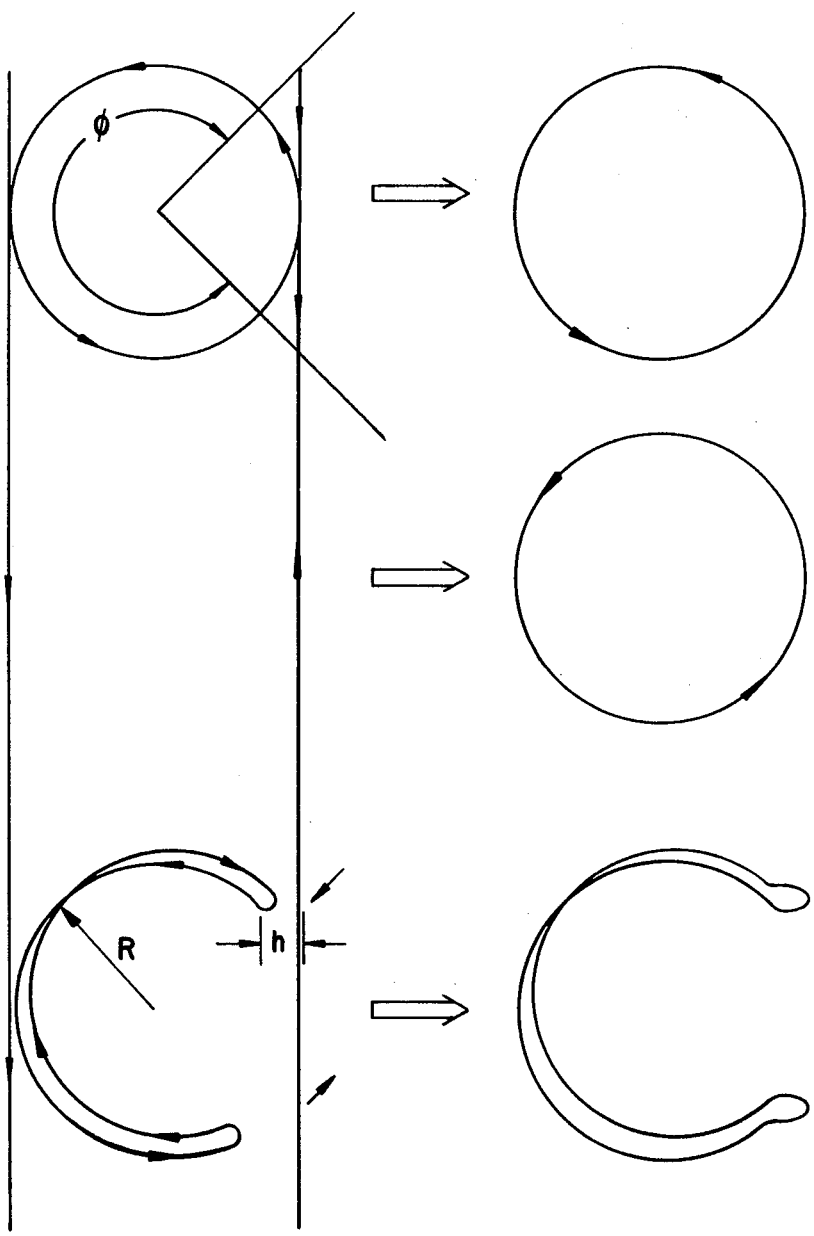
FIG. 12 is a representation of elements of a filamentary conductor as employed in the analytic approximations used to obtain values presented above.

The minimum field has only a $z$ component and can be approximated as shown in FIG. 12. First, approximate each arc of a circle as a circle plus a straight line. Second, approximate each loop by two straight infinite conductors.

The turnarounds are approximated as straight lines of length $2h$. Combining all these straight line elements one gets:

(2) $$B_{min} = \frac{2\mu_0 I h \sin\theta}{\pi R^2} \sqrt{1+\frac{h^2}{R^2}} \left\{1+\frac{1}{\sqrt{1+\frac{2h}{R}\cos\theta+\left(\frac{h}{R}\right)^2}}\right\} - \frac{8\mu_0 I h}{\pi R^3} \Delta Z$$

(3) $$= .0032 \left(\frac{h}{10 \text{ cm}}\right) \left(\frac{50 \text{ cm}}{R}\right)^2 \sin\theta \frac{\left\{1+\frac{1}{\sqrt{1+\frac{2h}{R}\cos\theta+\left(\frac{h}{R}\right)^2}}\right\}}{\sqrt{1+\left(\frac{h}{R}\right)^2}} - 0.0026 \left(\frac{h}{10 \text{ cm}}\right) \left(\frac{50}{R}\right)^3 \left(\frac{\Delta Z}{10 \text{ cm}}\right)$$

Figure 4:
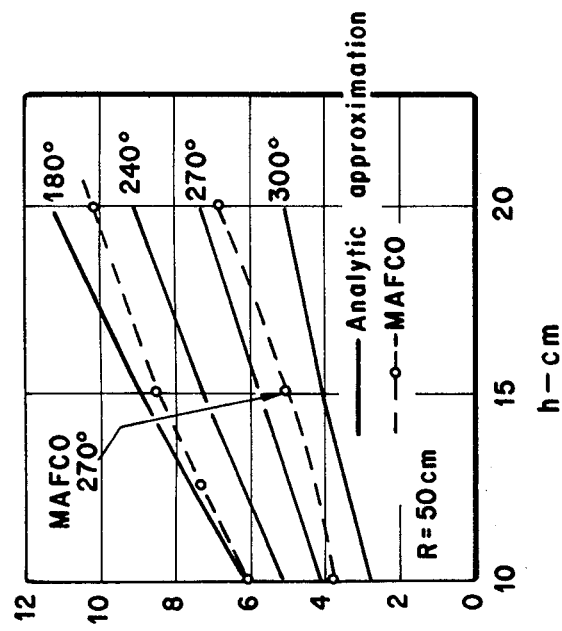
FIG. 4 is a graphical representation of the values obtained by MAFCO and analytic solutions for $B_{max}$, the maximum magnetic field value, and $B_{min}$, the minimum magnetic field values, at various angular positions, with variations in $h$, the spacing of the parallel lobes of a C-shaped solenoid segment of the magnet structure of FIGS. 1, 2 and 3.

These approximate $B_{min}$ and $B_{max}$ are plotted in Figures 4, 5 and 6.

Conductor length $l$ (4) $$l = 200\pi \frac{R}{50 \text{ cm}} \left\{\frac{\phi}{180°} + \frac{h}{R}\right\} \text{cm}$$

Volume.—The volume enclosed by the last closed contour of $|B|$ is nearly independent of $\phi$ and $h$.

(5) $$V_{closed} = 76 \left(\frac{R}{50}\right)^3 \text{ liters (for } \phi=270 \text{ } h=15 \text{ cm)}$$

The volume up to the mirror points of all field lines which pass through the last closed contour of $|B|$ is (6) $$V_{open} = 88 \left(\frac{R}{50 \text{ cm}}\right)^3 \text{ liters } (for \text{ } \phi=270 \text{ } h=15 \text{ cm.})$$

Adiabatic energy limit.—The energy of a proton which is just adiabatic according to the criterion $$a_\perp \frac{\nabla B}{B} \leq 5\% \text{ is:}$$

(7) $$E = E^* \left(\frac{B_{min}}{1 \text{ kgauss}}\right)^2 \left(\frac{R}{50 \text{ cm.}}\right)^2$$

Where $E^*$ is the adiabatic energy parameter appropriate for the coil parameters listed below.

TABLE I
[with 12 conductors]

| | | | |
|---|---|---|---|
| $E^*$=110 ev | $R$=50 cm. | $\phi$=270 | $h$=15 cm. $\Delta Z$=0 |
| $E^*$=110 ev | $R$=50 cm. | $\phi$=270 | $h$=20 cm. $\Delta Z$=0 |
| $E^*$=160 ev | $R$=50 cm. | $\phi$=180 | $h$=10 cm. $\Delta Z$=0 |
| $E^*$=170 ev | $R$=50 cm. | $\phi$=270 | $h$=15 cm. $\Delta Z$=0 |

Comparison with actual orbit calculations shows that the above adiabaticity criterion is a reasonable, albeit a somewhat conservative one.

POWER

The power consumption for the case $\Phi=270°, h=15$ cm., $R=50$ cm., $B_{min}=1.6$ KGAUSS, for a 200 cm.² cross section of 20° C. copper is 1.0 Mwatts. This allows a conductor packing factor of 50 percent and gives a mirror ratio of 4.9. If all dimensions are scaled linearly with radius, then the power scales as follows:

(8) $$P = 0.39 \left(\frac{B_{min}}{1 \text{ kgauss}}\right)^2 \left(\frac{R}{50 \text{ cm.}}\right) \text{ megawatts}$$

and the conductor volume is (9) $$V_{conductor} = 230 \left(\frac{R}{50 \text{ cm.}}\right)^3 \text{ liters}$$

The Yin-Yang coil is quite efficient, particularly at high mirror ratio, as can be seen from the following Example below where Yin-Yang coils are compared to Baseball-seam coils having similar magnetic characteristics.

EXAMPLE I

| | Mirror ratio=2.0 | Diameter=1 meter |
|---|---|---|
| | Yin-Yang ($\phi$=180°; $h$=20 cm.) | Basbeall-seam |
| Power (with the same conductor volume) | 1.0 | 1.4. |
| Power (with the same conductor cross section) | 1.0 | 2.3. |
| Current X conductor length | 880 ampere meters/gauss | 1,000 ampere meters/gauss. |
| | Mirror ratio=6.7 | Diameter=1 meter |
| | Yin-Yang ($\phi$=180°; $h$=10 cm.) | Baseball-seam (lobe angle=19°) |
| Power (with the same conductor volume) | 1.0 | 5.8. |
| Power (with the same conductor area) | 1.0 | 8.5. |
| Current X conductor length | 1,255 ampere meters/gauss | 3,000 ampere meters/gauss. |

We can see that the power consumption and currently density is considerably less for the Yin-Yang coil than for the Baseball-seam coil especially for a high mirror ratio.

Coils productive of confinement fields having a wide range of maximum field intensities, i.e., $B_{max}$ can be employed in fusion reaction practice. In laboratory devices $B_{max}$ fields as low as a few hundred to a few thousand gauss may be used. In power producing fusion reactors a $B_{max}$ ranging from about 50 kilogauss to above about 200 kilogauss may be used depending on the energy of the particles (plasma temperature), $\beta$ = ratio of plasma pressure to magnetic field pressure and the like.

The electromagnetic coil system of the invention may be advantageously substituted for the magnetic coil systems used to produce plasma and other high temperature gas or charged particle confinements in a wide variety of systems developed heretofore. The system may be used in either pulsed or continuous operations or combinations thereof. More particularly, the system can be used in the same manner as the "-Baseball or Tennis Ball Seam" magnets used extensively in the controlled fusion field as described in the reference cited supra. The system can also be substituted for the various magnetic mirror systems used, for example, in the "ALICE" device described, inter alia, in an article entitled "Cooperative Effects in a Tenuous Energetic Plasma Contained by a Magnetic Mirror Field," C. C. Damm et al., Physics of Fluids, Volume 8, No. 8, Aug. 1965, pp. 1472—1488. A similar substitution can be made in the pulsed "PYROTRON" or Magnetic Mirror Machines described, inter alia, in U.S. Pat. No. 3,170,841 issued Feb. 23, 1965, to Richard F. Post, entitled "Pyrotron Thermonuclear Reactor and Process" and, particularly, in the type of system disclosed in U.S. Pat. No. 3,069,344 issued Dec. 18, 1962, to Richard F. Post et al., entitled "Apparatus for the Densification and Energization of Charged Particles."

In general, when used in the production and confinement of charged particles or high temperature plasmas, such as a controlled fusion or thermonuclear plasma, an apparatus including the present electromagnet coil system will also include a housing or vessel means provided with evacuation means defining an evacuated region in which the plasma confinement zone is defined. A means for introducing energetic charged particles, e.g., fusionable light isotope elements or fuel, such as an energetic neutral particle source or plasma source, used in continuous or pulsed operating procedures, respectively, is also included. A power supply means for energizing the electromagnet with control and/or programming circuitry are also included generally in accord with practice common in the art.

An illustrative example of an apparatus embodiment in which the electromagnetic coil structure 10 is arranged for operation in accord with "ALICE" or "Baseball Seam Coil" practice is shown in FIG. 13 of the drawing. A vacuum pumping means 41 is connected as by a conduit 42 to evacuate the vessel 28. At least one source 43 is arranged to direct a beam of energetic neutral particles, e.g., H, D, T, $He_3$, etc., into the central region of volume 16 to be ionized by collision with background gas or plasma particles or by Lorentz forces to be trapped to form the desired plasma. Such a source 43 may comprise an ion source 44 producing ions such as $H_1^+D$, $T^+$, $He_3^+$ etc. in energies of, e.g., 1 kev. to 20 kev. which are directed through a neutralizer-purifier-collimator arrangement 46 to yield said beam of energetic neutral particles. Arrangement 46, as shown in said "Physics of Fluids" reference cited supra may include a neutralizer cell, beam collimators, baffles, diffusion pump 47, magnet coil for deflecting ions from the beam, gettering pumps, a water vapor streaming cell, valves and the like (not individually shown). The beam of energetic neutral particles emerging from the arrangement 46 may be directed through a beam guide tube 48 through a port 49 in vessel 28 generally along one plane, XZ or YZ, into the central portion of volume 16, i.e., also the central portion of the magnetic confinement zone to be ionized and trapped to form the plasma as described. Moreover, any of the ports 49 should be located in vessel 28 and the beam guide tube oriented in such a manner that the energetic neutral beam does not intersect the magnet coil structure in entering or leaving. Untrapped beam particles may, of course, be directed into a beam dump as in the case of the "ALICE" machine referred to above. Accordingly, a port 49 may be located at the corner and side position of vessel 28. In some instances it is advantageous to locate the port 49 in the vessel portions 32 whereat the molecular ion beam is directed across the field lines. The terminals 21, 21' and 22, 22', of coil segments 11 and 12, respectively, are connected to a DC power supply 51 to supply the electrical energy required to generate the magnetic field.

It may be noted that the Baseball Seam coil embodiment described in Table II corresponds substantially to that installed in said "Physics of Fluids" device wherefrom the installation and use of the comparable coil system of the invention should be readily apparent to those skilled in the art.

With a pulsed type device, for example, an ion source (not shown) would be substituted for the neutral particle source 43 and a pulsed burst of plasma would be directed axially into the confinement volume while the power supply 51 was pulsed in synchronism therewith to trap and heat the plasma as in the case of the well-known Pyrotron and Magnetic Mirror machines.

Energetic neutral and ionized particles injected may have an energy ranging from about 1 kev. to above about 100 kev. which produces a plasma of a corresponding temperature. Temperatures ranging from about 5 kev. for a T-D reaction to above about 20 kev. for a D-D reaction produces a significant fusion reaction rate in plasma having a density as low as about $10^{12}$ particles/cc. With higher temperatures, e.g., 20 to 50 kev., and with fuel ion densities in the range of about $10^{14}$ to about $10^{16}$ particles/cc. a fusion reaction rate in the range of self-sustaining or positive power output may be anticipated, particularly where the plasma is stably confined for periods of at least about 0.1 second.

What we claim is:

1. An electromagnetic coil structure for producing a quadrupole-type magnetic field defining a magnetic potential well containment zone for confining a high temperature plasma comprising a pair of generally C-shaped magnet coil segments, said coil segments each comprising a pair of spaced coextensive generally arcuate sectored C-shaped lobe members joined at the open ends by curved segments with the conductor member thereof being wound unidirectionally along the perimeter length of a respective segment, said C-shaped coil segments being arranged in mirror image rotated intermeshing relationship with the open ends of each of the C-shaped coextensive lobe configuration disposed in opposition across the closed spaced portion of the C-shaped lobe configuration of the other, said coil segments thereby defining a generally spheroidal central volume in which said quadrupole magnetic field is produced, said magnetic field including a centroidal plasma containment zone defined by magnetic field lines having an inwardly bowed good curvature.

2. An electromagnetic coil structure as defined in claim 1 wherein said C-shaped coil segments are rotated substantially 90° with respect to each other so that the median planes between the parallel lobes of said segments intersect to define a Z-axis of a coordinate system along which Z-axis the separation distance, $\Delta Z$, of said segments may be indicated, said median planes comprising X-Z, and Y-Z, planes respectively, and with the origin being at the center of said central volume when the separation distance $\Delta Z=0$, whereat the Z=0 plane transversely bisects all of said segment lobes.

3. An electromagnetic coil structure as defined in claim 2 wherein said separation distance $\Delta Z$ is in a range whereat the magnetic mirror ratio $R_{11}=B_{max}/B_{min}$, the ratio of maximum to minimum magnetic field intensities of the magnetic containment field produced in said central volume is in the range of about 1.5 to about 7.0.

4. An electromagnetic coil structure as defined in claim 2 wherein said magnet coil segments occupy an arcuate angular sector in the range of about 180° to about 270°.

5. A structure as defined in claim 3 wherein said magnet coil segments produce a magnetic field in the range of about 1 kilogauss to above about 200 kilogauss.

6. A structure as defined in claim 2 having evacuable vessel means defining at least a central region in said central volume, said vessel including generally parallel sided boxlike portions disposed between said parallel C-lobe portions and joined along the lines of intersection within said central volume, said vessel including port means for attachment of a source for directing a beam of energetic particles into said containment zone for forming a plasma therein.

7. A structure as defined in claim 6 wherein said vessel means includes generally cylindrical segments intersecting with and joined to said parallel sided portions and defining an enlarged evacuable central region in said central volume.

8. A structure as defined in claim 7 wherein said magnet coil segments are provided with a magnetically permeable encasement.

UNITED STATES PATENT OFFICE
CERTIFICATE OF CORRECTION

Patent No. 3,582,849     Dated  June 1, 1971

Inventor(s)  Richard F. Post and Ralph W. Moir

It is certified that error appears in the above-identified patent and that said Letters Patent are hereby corrected as shown below:

Column 5, line 37, is to be read as follows:

-- below about $10^{-6}$ mm Hg, or, preferably, below $10^{-8}$ mm Hg, --

Signed and sealed this 21st day of December 1971.

(SEAL)
Attest:

EDWARD M. FLETCHER, JR.      ROBERT GOTTSCHALK
Attesting Officer     Acting Commissioner of Patents